US006296289B1

(12) United States Patent
Gehring et al.

(10) Patent No.: US 6,296,289 B1
(45) Date of Patent: Oct. 2, 2001

(54) ASSEMBLY FOR ORGANIZING A STORAGE AREA OF A MOTOR VEHICLE

(75) Inventors: Thomas Franz Joseph Gehring, Scarborough; Brian Flaman; Dejan Havidic, both of Toronto; Ireneusz Jankowski, Richmond Hill, all of (CA)

(73) Assignee: Collins & Aikman Plastics, Inc., Troy, MI (US)

( * ) Notice: Subject to any disclaimer, the term of this patent is extended or adjusted under 35 U.S.C. 154(b) by 0 days.

(21) Appl. No.: 09/629,561

(22) Filed: Jul. 31, 2000

(51) Int. Cl.[7] ...................................................... B60R 5/00
(52) U.S. Cl. ........................................ 296/37.5; 296/37.1
(58) Field of Search ................................... 296/37.6, 37.5, 296/37.1, 37.8, 37.16; 410/130, 132, 139, 192; 224/404, 539, 42.34

(56) References Cited

U.S. PATENT DOCUMENTS

| | | | |
|---|---|---|---|
| 4,718,584 | * 1/1988 | Schoeny | 296/37.5 X |
| 5,340,183 | * 8/1994 | Horian | 296/37.5 X |
| 5,526,972 | * 6/1996 | Frazier et al. | 296/37.6 X |
| 6,053,553 | * 4/2000 | Hespelt | 296/37.1 |

* cited by examiner

Primary Examiner—Joseph D. Pape
(74) Attorney, Agent, or Firm—Myers Bigel Sibley & Sajovec

(57) ABSTRACT

A storage assembly is disclosed for use in a storage area of a motor vehicle. The storage assembly includes a primary support that is pivotally secured to a load floor of the storage area or the floor covering that covers the load floor. The primary support is a wall that pivots between a stowed position and a use position. Attached to the primary support is a side wall. The side wall also pivots between two positions, i.e., a collapsed position and an extended position. The side wall and the primary support define a space within the storage area that is secure for storing a small object therein without having it shift or tip over during the operation of the motor vehicle. When not desired, it folds down against the load floor and is out of the way.

18 Claims, 3 Drawing Sheets

ASSEMBLY FOR ORGANIZING A STORAGE AREA OF A MOTOR VEHICLE

BACKGROUND OF THE INVENTION

1. Field of the Invention

The invention relates to storage areas of a motor vehicle. More specifically, the invention relates to a compartmental assembly for organizing such areas.

2. Description of the Related Art

Storage facilities in motor vehicles vary drastically in sizes and configurations. Some storage facilities are standard trunks in automobiles. Other storage facilities include a space between a bench seat and a tailgate in sport utility vehicles and minivans. A common element in all storage facilities for motor vehicles is that they include a load floor and storage area walls extending around the periphery of the load floor of the storage area.

In many instances, the storage space or compartment of the motor vehicle is cavernous. This creates a hardship for the user of the storage area because items placed therein may shift about. In addition, some items such as bags of groceries may spill. This renders the storage area dysfunctional.

In some motor vehicles, a net is provided to aid the user of a storage space. When used, the net is hooked to the storage area walls and/or the load floor at points selected by the user to ensure the items placed therein do not shift and spill during the operation of the motor vehicle. The disadvantage associated with this system is that the items may move regardless of their location within the net because the net is such a flexible retainer. This is particularly true when the items are heavy. Further, it is desirable at times to have a solid structure to divide the storage area as an alternative to the net. This provides a comfort to the user when placing items within the storage area because the user does not have to contemplate how the net is going to give or contort under pressure by forces being applied to the items secured thereby.

SUMMARY OF THE INVENTION

A storage assembly is designed for a motor vehicle having a storage area that is defined by storage area walls and a load floor. The load floor includes slots cut therein. The storage assembly includes a primary support pivotally secured to the load floor. The primary support pivots between a stowed position, which is substantially aligned with the load floor, and a use position, which extends out and away from the load floor. A side wall is secured to the primary support. The side wall pivots between a collapsed position and an extended position. The collapsed position is defined as when the side wall extends between and abuts the load floor and the primary support. The extended position is defined when the side wall extends substantially perpendicularly to the primary support. The side wall includes an internal face and an external face and defining a perimeter therearound. An engaging member extends out from a portion of the perimeter of the side wall. The engaging member acting in conjunction with the slots of the load floor move the side wall between the collapsed position and the extended position when the primary support moves between the stowed position and the use position, respectively.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
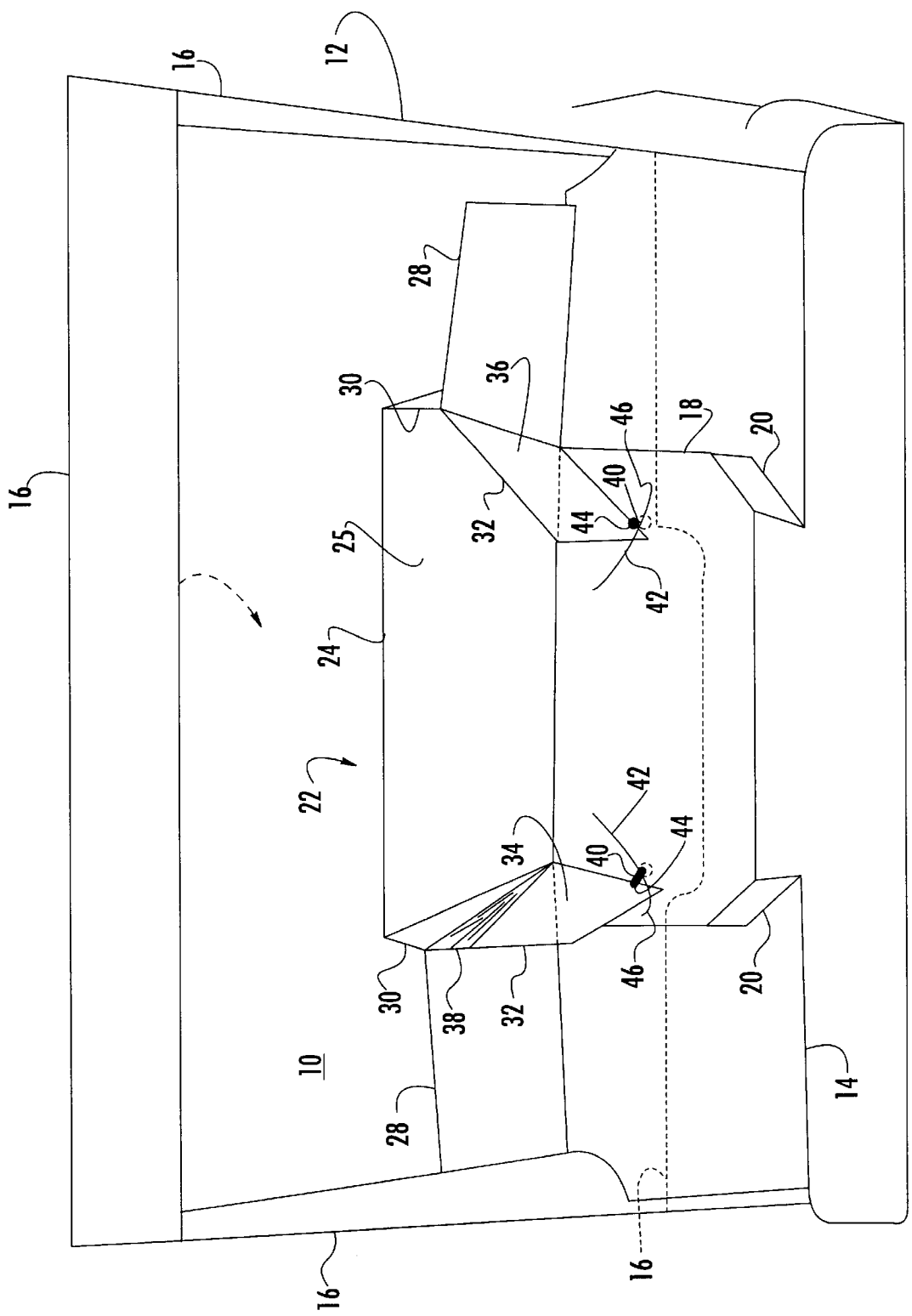
FIG. 1 is a perspective view partially cut away of one embodiment of the invention secured within a storage area of a motor vehicle.
Figure 2:
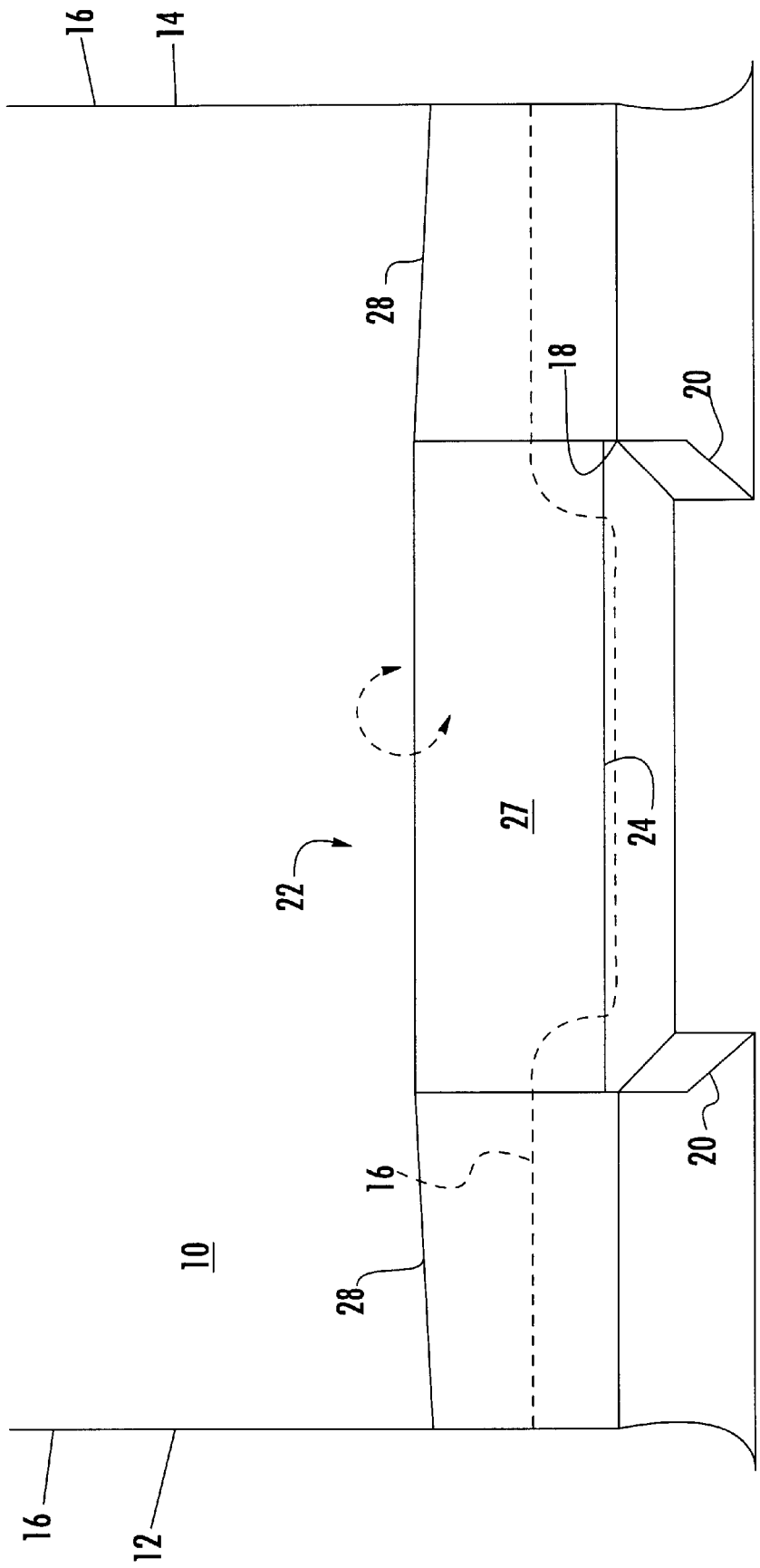
FIG. 2 is a perspective view partially cut away of one embodiment of the invention secured within a storage area of a motor vehicle.
Figure 3:
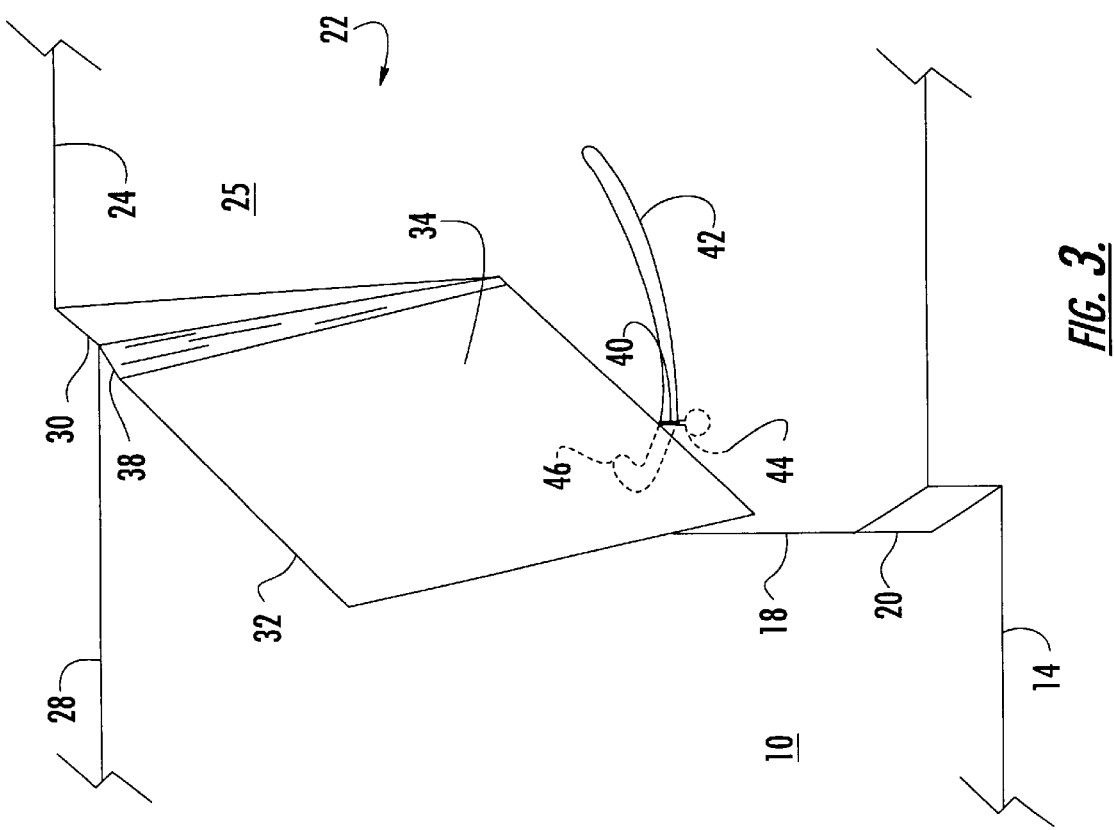
FIG. 3 is a perspective view partially cut away of one embodiment of the invention secured within a storage area of a motor vehicle showing slots in the load floor of the motor vehicle.

Referring to the Figures, a storage area 10 of a motor vehicle 12 is shown. It should be appreciated by those skilled in the art that, while the storage area 10 shown in the Figures is a trunk of an automobile, any storage area 10 of any motor vehicle 12 may include the invention disclosed herein. The storage area 10 is defined by a load floor 14 and storage area walls 16. The storage area walls 16 may include walls of the passenger compartment of the motor vehicle or sides of the trunk 10. A portion of the storage area walls 16 may include a portion of a trunk lid or access (neither shown). The load floor 14 may be flat or, as is shown in FIG. 1, it may include a platform 18. A platform 18 includes platform sides 20. The platform 18 may define a plane that is parallel to a plane defined by the load floor 14. Alternatively, the platform 18 may be oriented relative to the load floor 14 such that a plane defined by the platform 18 is transverse to a plane defined by the load floor 14, as illustrated in FIG. 1. In the illustrated embodiment of FIG. 1, the platform 18 provides added storage capacity therebelow. In one embodiment, the added storage capacity is used for housing a spare tire of the motor vehicle 12.

The invention is generally indicated at 22. The invention 22 is a storage assembly. The storage assembly 22 is used within the motor vehicle 12 and, more particularly, the storage area 10 thereof. The storage assembly 22 is designed to divide the storage area 10 into smaller areas or compartments so that items stored within the storage area 10 do not shift about or spill because there is nothing retaining the items in a particular location within the storage area 10 when the items have a size which is not comparable to the size of the storage area 10.

The storage assembly 22 includes a primary support 24. The primary support 24 is a wall that is positioned such that the majority of any laterally directed force created by placing items on the load floor 14 is received by the primary support 24. The primary support 24 is pivotally secured to the load floor 14. In one embodiment, the primary support 24 is secured to the load floor 14 using a hinge (not shown). In another embodiment, the carpet used to cover the load floor 14 also is used to cover an external face 27 (FIG. 1) to the primary support 24. This carpet allows for the appearance that the primary support 24 and the load floor 14 are an integral structure. It is the carpet that provides the pivotal relationship between the primary support 24 and the load floor 14.

The primary support 24 acts as a wall subdividing the storage area 10 into at least two areas, i.e., in front of and behind the primary support 24. The primary support 24 is pivotal between a stowed position and the use position. In the stowed position, the primary support 24 is substantially aligned with the load floor 14 with its internal face 25 resting against the load floor 14 and its external face 27 acting as a portion of the load floor 14, capable of having objects placed thereon. Conversely, in the use position, the primary support 24 extends out and away from the load floor 14. In the embodiment shown in FIG. 1, the primary support 24 in its use position is perpendicular to the platform 18 and not the load floor 14. It should be appreciated by those skilled in the art that the primary support 24 may extend in any position relative to the load floor 14 and any platform 18 present without changing the scope of the invention.

An extension 28 extends out from the primary support 24 on either side thereof. The extension 28 allows for the primary support 24 to be subdivided into smaller support walls, discussed in greater detail subsequently. The extensions 28 are connected to the primary support 24 by two connecting walls 30. The connecting walls 30 are perpendicular to both the primary support 24 and the extensions 28. The connecting walls 30 are required when the primary support 24 is connected to a load floor 14 that incorporates a platform 18. The connecting walls 30 allow the extensions 28 to be disposed adjacent the load floor 14 while allowing the primary support 24 to be disposed adjacent the platform 18 when the primary support 24 is in its stowed position.

The storage assembly 22 also includes a side wall 32. In the preferred embodiment, there are two side walls 32. The side wall 32 is pivotally secured to the primary support 24. The pivotal support of the side wall 32 allows the side wall 32 to move between a collapsed position and an extended position. The collapsed position of the side wall 32 is defined as the position of the side wall 32 when it is abutting the load floor 14 and the primary support when the load floor 14, the primary support 24 and the side wall 32 are generally parallel to each other. It should be appreciated by those skilled in the art that the load floor 14 may be replaced by the platform 18 should the load floor 14 include such a platform 18. In the extended position, the side wall 32 is generally perpendicular to the primary support 24. The side wall 32 defines an internal face 34, an external face 36 and a side wall perimeter. Within the collapsed position, the internal face 34 abuts the primary support 24 and the external face 36 abuts the load floor 14 or the platform 18, if present. A portion of the perimeter of the side wall 32 is fixedly secured to the primary support 24 such that there is a pivotal relationship therebetween. In one embodiment, a curtain 38 extends between a portion the primary support 24 and the side wall 32. The curtain 38 provides a structure that prevents items from moving past the side wall 32, but also allows lost motion between the side wall 32 and the primary support 24 when the side wall 32 is moving relative to the primary support 24. It should be appreciated by those skilled in the art that the curtain 38 may be fabricated from a netting or other material suitable for maintaining the position of items held therein while providing flexibility in the spatial relationship between the side wall 32 and the primary support 24.

The storage assembly 22 has a primary support 24 with two extensions 28 extending axially out therefrom and two side walls 32 extending perpendicularly out therefrom and is capable of dividing the storage area 10 into four smaller storage areas. The smaller storage area is defined by the internal face 25 of the primary support 24, the two side walls 32 and one of the storage area walls 16. Two other smaller storage areas are defined by a side wall 32, an extension 28 and two of the storage area walls 16. The final smaller storage area is defined by the external face 27 of the primary support 24, a portion of two of the storage area walls 16 and a fourth storage area wall 16.

The storage assembly 10 also includes an engaging member 40 that extends out from a portion of the perimeter of the side wall 32. In the embodiment shown, the engaging member 40 extends out of the bottom of each of the two side walls 32. The engaging member 40 acts in conjunction with slots 42 of the load floor 14 to move the side walls 32 between their collapsed positions in their extended positions when the primary support 24 moves between its stowed and use positions. Therefore, the operator of the storage assembly 22 need only to hold the primary support 24 to move the entire storage assembly 22 between its two configurations. Thus, the engaging members 40 and the slots 42 allow the user to use just one hand to operate the storage assembly 22 without having to place what is being held down to operate the storage assembly 22. In the embodiment shown, the engaging member 40 is a pin 44 which extends through the slots 42. The pin 44 and slots 42 may be replaced with other positive structures that allow the side walls 32 to engage the load floor 14 (or platform 18). The two side walls 32 shown each have a pin 44 that extends into a corresponding slot 42. Each slot 42 is arcuate throughout the relative motion between the side walls 32 and the primary support 24. In addition, there may be more than one pin 44 and slot 42 per side wall 32.

The slots 42 may include a lock 46. The lock 46 is a portion of the slot 42 that does not extend within the same line as the rest of the slot 42. More specifically, the lock 46 receives a pin 44 therein when the primary support 24 and side walls 32 are moved to the use and extended positions, respectively. This prevents the storage assembly 22 from collapsing upon itself or relying on the existence of an object therein to not fall back on itself to its respective stowed and collapsed positions.

The slots 42 may include structures that are not a part of the load floor 14. In this instance, the slots 42 would be defined by a structure that is integrated into the carpet covering the load floor 14. Further, the pin 44 may include a joint or ball and socket relationship depending on the amount of freedom required between the side wall 32 and the load floor 14.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A storage assembly for a vehicle having a storage area defined by storage area walls and a load floor having slots, said storage assembly comprising:

a primary support pivotally secured to the load floor, said primary support pivotal between a stowed position substantially aligned with the load floor and a use position extending out and away from the load floor;

a side wall pivotally secured to said primary support, said side wall pivotal between a collapsed position such that said side wall extends between and abuts the load floor and said primary support and an extended position substantially perpendicular to said primary support, said side wall including an internal face and an external face and defining a perimeter therearound; and an engaging member extending out from a portion of said perimeter of said side wall, said engaging member acting in conjunction with the slots of the load floor to move said side wall between said collapsed position and said extended position when said primary support moves between said stowed position and said use position, respectively.

2. A storage assembly as set forth in claim 1 wherein said primary support includes an extension extending out therefrom past said side wall.

3. A storage assembly as set forth in claim 2 including a connecting wall connecting said extension to said primary support.

4. A storage assembly as set forth in claim 3 including a curtain connecting said connecting wall to said side wall.

5. A storage assembly as set forth in claim 4 wherein said curtain is flexible.

6. A storage assembly as set forth in claim 5 wherein said engaging member is a pin.

7. A storage assembly for a vehicle having a storage area defined by a load floor and storage area walls, said storage assembly comprising:

a primary support pivotally secured to the load floor, said primary support pivotal between a stowed position substantially aligned with the load floor and a use position extending out and away from the load floor;

a side wall pivotally secured to said primary support, said side wall pivotal between a collapsed position such that said side wall extends between and abuts the load floor and said primary support and an extended position substantially perpendicular to said primary support, said side wall including an internal face and an external face and defining a perimeter therearound; and an engaging member extending out from a portion of said perimeter of said side wall to move said side wall between said collapsed position and said extended position when said primary support moves between said stowed position and said use position, respectively.

8. A storage assembly as set forth in claim 7 wherein said primary support includes an extension extending out therefrom past said side wall.

9. A storage assembly as set forth in claim 8 including a connecting wall connecting said extension to said primary support.

10. A storage assembly as set forth in claim 9 including a curtain connecting said connecting wall to said side wall.

11. A storage assembly as set forth in claim 10 wherein said curtain is flexible.

12. A storage assembly as set forth in claim 11 wherein said engaging member is a pin.

13. A storage area comprising:

a load floor defining a load floor periphery and having a slot;

a plurality of storage area walls extending around said load floor periphery;

a primary support pivotally secured to said load floor, said primary support pivotal between a stowed position substantially aligned with said load floor and a use position extending out and away from said load floor;

a side wall pivotally secured to said primary support, said side wall pivotal between a collapsed position such that said side wall extends between and abuts said load floor and said primary support and an extended position substantially perpendicular to said primary support, said side wall including an internal face and an external face and defining a side wall perimeter therearound; and an engaging member extending out from a portion of said side wall perimeter of said side wall, said engaging member being received by said slot in said load floor to engage to move said side wall between said collapsed position and said extended position when said primary support moves between said stowed position and said use position, respectively.

14. A storage assembly as set forth in claim 13 wherein said primary support includes an extension extending out therefrom past said side wall.

15. A storage assembly as set forth in claim 14 including a connecting wall connecting said extension to said primary support.

16. A storage assembly as set forth in claim 15 including a curtain connecting said connecting wall to said side wall.

17. A storage assembly as set forth in claim 16 wherein said curtain is flexible.

18. A storage assembly as set forth in claim 17 wherein each of said engaging members is a pin to be received by each of said plurality of slots.

* * * * *